United States Patent

Takiguchi et al.

[11] Patent Number: 5,888,170
[45] Date of Patent: Mar. 30, 1999

[54] DOWNSHIFT CONTROL DEVICE FOR AUTOMATIC TRANSMISSION

[75] Inventors: Masahiro Takiguchi; Yoshifumi Fujita, both of Fuji, Japan

[73] Assignee: Jatco Corporation, Japan

[21] Appl. No.: 900,153

[22] Filed: Jul. 28, 1997

[30] Foreign Application Priority Data

Jul. 31, 1996 [JP] Japan .................................. 8-202235

[51] Int. Cl.$^6$ .................................................. F16H 61/08
[52] U.S. Cl. .......................... 477/146; 477/144; 477/156; 701/61
[58] Field of Search ..................................... 477/143, 144, 477/146, 156, 158, 148, 149; 701/51, 59, 61

[56] References Cited

U.S. PATENT DOCUMENTS

| | | | |
|---|---|---|---|
| 4,793,216 | 12/1988 | Hiramatsu et al. | 701/51 X |
| 4,989,477 | 2/1991 | Hunter et al. | 477/148 |
| 5,012,699 | 5/1991 | Aoki et al. | 477/148 |
| 5,070,747 | 12/1991 | Lentz et al. | 477/149 |
| 5,211,079 | 5/1993 | Runde et al. | 477/148 X |
| 5,363,724 | 11/1994 | Asahara et al. | 477/156 X |
| 5,368,531 | 11/1994 | Ando et al. | 477/143 X |
| 5,429,561 | 7/1995 | Wakahara et al. | 477/143 X |
| 5,547,437 | 8/1996 | Kamada et al. | 477/143 |

*Primary Examiner*—Dirk Wright
*Assistant Examiner*—Peter T. Kwon
*Attorney, Agent, or Firm*—Rossi & Associates

[57] ABSTRACT

A downshift control device for an automatic transmission is provided in which the transmission is shifted down by releasing an oil pressure from a first engaging element that has been engaged while applying an oil pressure to a second engaging element that has been released. Thus downshift control device includes power-on downshift determining mechanism, gear-ratio detecting mechanism for detecting a gear ratio that changes during power-on downshift control, downshift released pressure control mechanism for generating a command to increase the pressure released from the first engaging element to a released pressure control actuator when the detected gear ratio reaches a first predetermined gear ratio, and downshift applied pressure control mechanism for generating a command to increase the pressure applied to the second engaging element to an applied pressure control actuator when the detected gear ratio reaches a second predetermined gear ratio that is larger than the first predetermined gear ratio and is established just before completion of shifting.

5 Claims, 11 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◍ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| SOLENOID<br>GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (DRAIN CLOSED)
× ··· OFF (DRAIN OPEN)

5,888,170

DOWNSHIFT CONTROL DEVICE FOR AUTOMATIC TRANSMISSION

BACKGROUND OF THE INVENTION

1. Field of the Invention

The present invention relates to a downshift control device for an automatic transmission, and more particularly to a technique for controlling a pressure applied to an engaging element and a pressure released from another engaging element in the process of shifting down of the transmission which is initiated by depressing an accelerator pedal or manually selecting a gear position while the vehicle is in a power-on condition.

2. Description of the Prior Art

There is known a shift control device for an automatic transmission as disclosed in Japanese laid-open Patent Publication No. 2-80850. In order to reduce shift shocks when the transmission is shifted down in a power-on condition of the vehicle, the control device disclosed in this publication is provided with delaying means for delaying engagement of a first input clutch that is to be engaged upon downshifting (by restricting or reducing an increase in the pressure applied to the first input clutch in the later period of shifting), so as to prevent the first input clutch from being engaged with a transmission torque capacity before a first one-way clutch is engaged such that the rotating speed of an input shaft of the transmission matches the gear position in which the transmission is to be placed after the downshifting.

Since the above-described known downshift control device employs the one-way clutch for optimizing the downshift timing in which the input and output shafts of the transmission are rotated in synchronization, pull-in or drawing shocks can be avoided and desirable downshifting can be thus achieved by suitably controlling the pressure applied to the clutch during downshifting and restricting the increase in the rotating speed of the input shaft of the transmission. In an automatic transmission equipped with a power transmitting system in which the one-way clutch is eliminated, on the other hand, the downshift timing for realizing the synchronized rotation is determined by monitoring the increase in the pressure applied to the clutch, but the rotating speed of the input shaft of the transmission cannot be controlled by controlling the pressure applied to the clutch.

In the automatic transmission equipped with the power transmitting system in which the one-way clutch is eliminated, therefore, when the clutch pressure to be applied is increased earlier than the synchronization timing (as indicated in "k" in FIG. 14), by keeping the engine speed NE (turbine speed NT) being increased at a high rate (steep slope of increase in the engine speed NE) throughout the downshift operation, as shown in FIG. 14, the rotation of the input shaft is pulled up and the output torque TQ becomes temporarily negative, resulting in pull-in shocks. These shocks may be reduced where the clutch pressure to be applied is increased concurrently with the synchronization timing (as indicated in "m" in FIG. 14). Where the clutch pressure to be applied is increased later than the synchronization timing (as indicated in "n" in FIG. 14), however, the rotation of the engine that is racing is pulled down, and the output torque TQ is temporarily raised to a great extent, resulting in thrust shocks.

As described above, where the slope of increase in the engine speed NE (turbine speed NT) (=slope of increase in the gear ratio) greatly changes in a region around the synchronization timing, the clutch pressure to be applied must be increased in the timing that is almost equivalent to a point of time or a moment. Where rotating conditions, oil temperature and other conditions slightly differ each time the transmission is shifted down, therefore, the clutch pressure to be applied cannot be always increased at the same time as the synchronous rotation of the input and output shafts of the transmission, and the pull-in shocks or thrust shocks cannot be avoided.

SUMMARY OF THE INVENTION

The first object of the present invention is to provide a downshift control device for an automatic transmission wherein the transmission is shifted down to a first gear position to be established after downshifting by releasing an oil pressure from a first engaging element that has been engaged in a second gear position established before the downshifting while applying an oil pressure to a second engaging element that has been released in the second gear position, which control device controls the released pressure so that the applied pressure can be increased upon downshifting, within a certain range of time that allows for variations in shift conditions, thus assuring a good shift feeling.

It is a second object of the invention to provide the downshift control device as described above, wherein the shock level can be reduced by eliminating or cutting an excessive increase in the output torque in the terminal stage of the shifting operation.

It is a third object of the invention to provide the downshift control device as described just above, which stops cutting the output torque upon completion of the shifting operation so as to assure a good accelerating characteristic of the vehicle.

It is a fourth object of the invention to provide the downshift control device as described above, which controls the pressure released from the first engaging element, by controlling a back pressure of an accumulator for this engaging element, assuring quick response and high stability.

It is a fifth object of the invention to provide the downshift control device as described above, which does not suffer from variations and chronological changes in the system.

To accomplish the first object, there is provided a downshift control device for an automatic transmission as shown in FIG. 1 wherein the transmission is shifted down to a first gear position to be established after downshifting, by releasing an oil pressure from a first engaging element "a" that has been engaged in a second gear position established before the downshifting while applying an oil pressure to a second engaging element "b" that has been released in the second gear position, the downshift control device comprising: power-on downshift determining means "c" for determining whether a downshift command is generated to shift down the automatic transmission while an accelerator pedal is being depressed; gear ratio detecting means "d" for detecting a gear ratio of the transmission that changes during power-on downshift control; a released pressure control actuator "e" for controlling a pressure released from the first engaging element "a" that is to be released by downshifting; an applied pressure control actuator "f" for controlling a pressure applied to the second engaging element "b" that is to be engaged by downshifting; downshift released pressure control means "g" for generating a first command to increase the pressure released from the first engaging element "a" to the released pressure control actuator "e" when the gear ratio detected by the gear ratio detecting means reaches a first predetermined gear ratio; and downshift applied pressure control means "h" for generating a second command to increase the pressure applied to the second engaging element "b" to the applied pressure control actuator "f" when the gear ratio detected by the gear ratio detecting means reaches a second predetermined gear ratio that is larger than the first predetermined gear ratio and is established just before completion of shifting.

The operation of the downshift control device constructed as described above will now be described. If the power-on downshift determining means "c" determines that a downshift command is generated to shift down the transmission due to depressing the accelerator pedal during running of the vehicle, a shift valve(s) or the like is switched so as to release the oil pressure from the first engaging element "a" that has been engaged in the second gear position before downshifting, and apply the oil pressure to the second engaging element "b" that has been released in the second gear position, while monitoring the gear ratio detected by the gear ratio detecting means "d".

If the detected gear ratio reaches the first predetermined gear ratio in the later period of shifting, the downshift released pressure control means "g" generates to the released pressure control actuator "e" a command to increase the released pressure of the first engaging element "a" that has been lowered. Subsequently, if the detected gear ratio reaches the second predetermined gear ratio that is larger than the first predetermined gear ratio and is established just before completion of the shifting, the downshift applied pressure control means "h" generates to the applied pressure control actuator "f" a command to rapidly increase the pressure applied to the second engaging element "b", which pressure has been slowly increased.

In the above manner, the power-on downshifting is controlled such that the released pressure of the first engaging element "a" that has been lowered is temporarily increased by the downshift released pressure control means "g", prior to the control of the downshift applied pressure control means "h" for increasing the pressure applied to the second engaging element "b". As a result, the slope of increase of the engine speed (turbine speed ) (=slope of increase in the gear ratio) is kept being small in the later period of downshifting, whereby the pressure applied to the second engaging element "b" may be increased upon detection of a suitable gear ratio, within a certain range of time that allows for some variations in the timing of increasing the applied pressure. Thus, even where rotating conditions of input and output shafts of the transmission and the oil temperature slightly differ in each shifting operation, the transmission may be shifted with its input and output shafts being synchronously rotated, thus avoiding pull-in shocks and thrust shocks and assuring a good shift feeling.

Namely, the above control of the pressure released from the first engaging element contributes to controlling the rotation of the transmission input shaft, and the first engaging element "a" that was almost completely released is lightly engaged again, thereby to temporarily retard or delay the process of downshifting.

To accomplish the second object of the invention, the downshift control device for an automatic transmission as described above may be adapted such that the downshift released pressure control means "g" generates the first command to increase the pressure released from the first engaging element "a" when the detected gear ratio reaches the first predetermined gear ratio, and then generates a third command to hold the increased released pressure for a predetermined period of time, the first command and the third command being generated to the released pressure control actuator "e".

In the above manner, the first engaging element "a" is kept being lightly engaged for the predetermined time in the later period of shifting, so as to avoid racing of the engine which would occur if the first engaging element "a" is released without being engaged again. By pulling down the rotation of the racing engine, an excessive increase in the output torque that would appear upon completion of the shifting may be eliminated, and the shock level that is determined by a fall of the output torque can be reduced to be sufficiently small.

To accomplish the third object of the invention, the downshift control device for an automatic transmission as described just above may be adapted such that the downshift released pressure control means generates the first command to increase the pressure released from the first engaging element when the detected gear ratio reaches the first predetermined gear ratio, then generates the third command to hold the increased released pressure for the predetermined period of time, and then generates a fourth command to lower the increased released pressure, to the released pressure control actuator.

The operation of the above downshift control device will be described. If the shifting operation is terminated while the released pressure of the first engaging element "a" has been increased, the increase of the output torque is excessively restricted, resulting in poor acceleration of the vehicle immediately after the shifting, and causing judder due to the light engagement of the first engaging element "a". According to the present invention, the released pressure that has been increased is lowered again, after being kept at the high level for the predetermined period of time, thus assuring a good accelerating characteristic of the vehicle immediately after the shifting, while yielding the effects as described above.

To accomplish the fourth object of the invention, the released pressure control actuator "e" of the downshift control device as described above may comprise a solenoid valve which continuously controls a back pressure of an accumulator for the first engaging element "a" in response to a drive command.

As a method for controlling the released pressure of the first engaging element "a", the oil pressure released from the first engaging element "a" may be directly controlled. In this direct control method, however, the pressure control is greatly affected by the flow rate in oil chambers and oil paths, and thus suffer from lack of stability. Where the back pressure of the accumulator provided in the oil path leading to the first engaging element "a" is controlled so as to provide shelf-pressure characteristics, on the other hand, the engaging pressure applied to the first engaging element may be immediately changed by varying the accumulator back pressure, thus assuring quick response and high stability.

To accomplish the fifth object of the invention, the downshift control device for an automatic transmission as described above may further include learning correction means for correcting by learning a level of the pressure released from the first engaging element which is controlled by the downshift released pressure control means, depending upon a value of the gear ratio or a rate of change in the gear ratio.

The operation of the downshift control device as described above will be described. In the case where the level to which the released pressure of the first engaging element "a" is increased is corrected by learning, based on the rate of change of the gear ratio, the actual rate of change of the gear ratio is compared with a reference rate of change of the gear ratio upon completion of the first power-on downshift operation. The level of the increased oil pressure is reduced if the actual rate of change of the gear ratio is lower than the reference change rate, and is increased if the actual rate of change of the gear ratio is higher than the reference change rate. In the next power-on downshift operation, the control of the released pressure is effected according to the oil pressure level that has been corrected, and the level of the increased oil pressure is corrected again when the current shift operation is completed. Thus, the correction of the level of the increased pressure is repeated each time power-on downshifting is effected.

Owing to the learning correction as described above, the released pressure of the first engaging element "a" can be controlled to an optimum level, irrespective of variations or chronological changes in the system.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

The first embodiment of the present invention in the form of a downshift control device for an automatic transmission will be hereinafter described.

First, there will be schematically described the whole construction of the automatic transmission in which the downshift control device of the first embodiment is employed.

Figure 1:
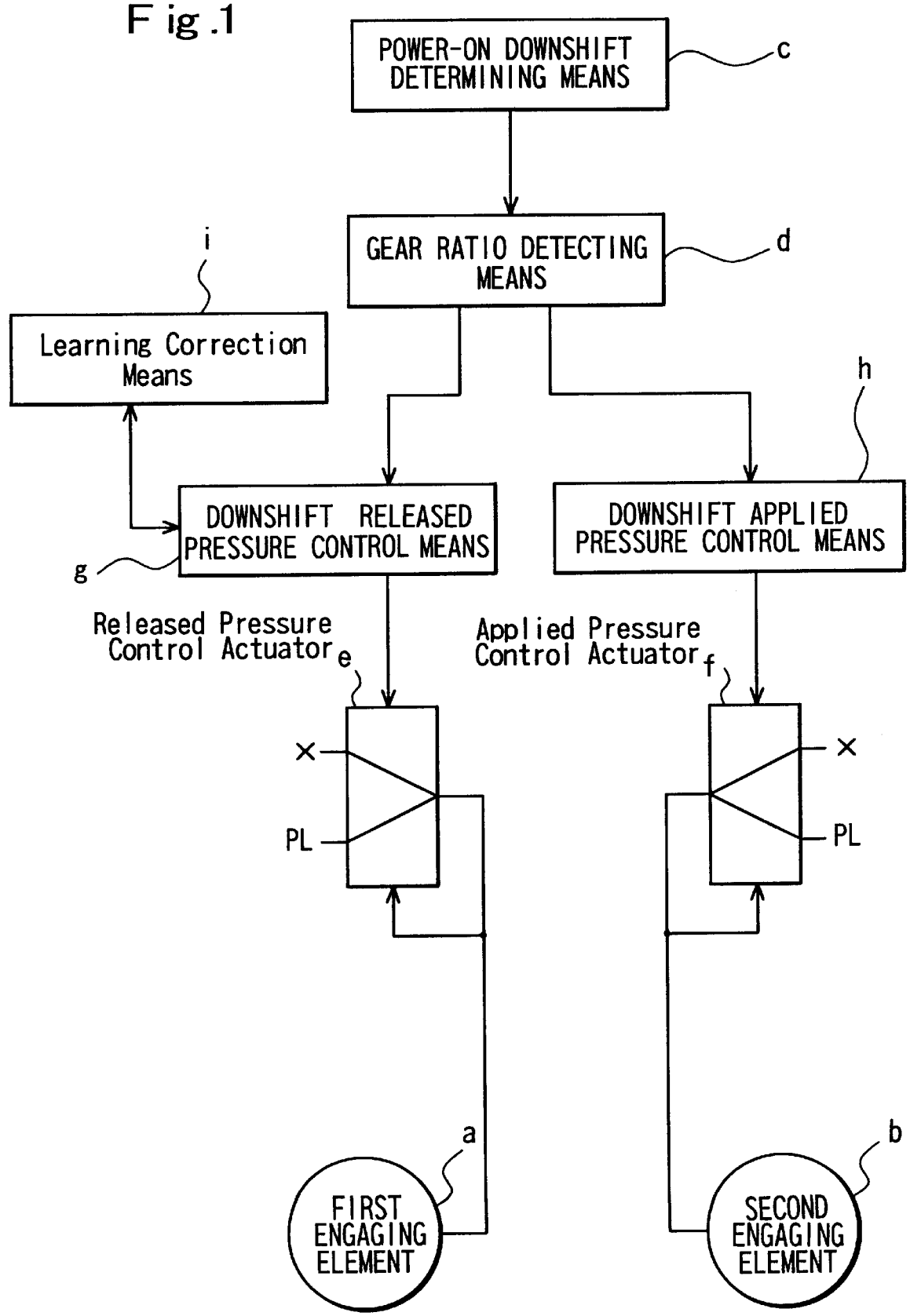
FIG. 1 is a view showing the construction of a downshift control device for an automatic transmission according to the present invention.
Figures 2, 3:
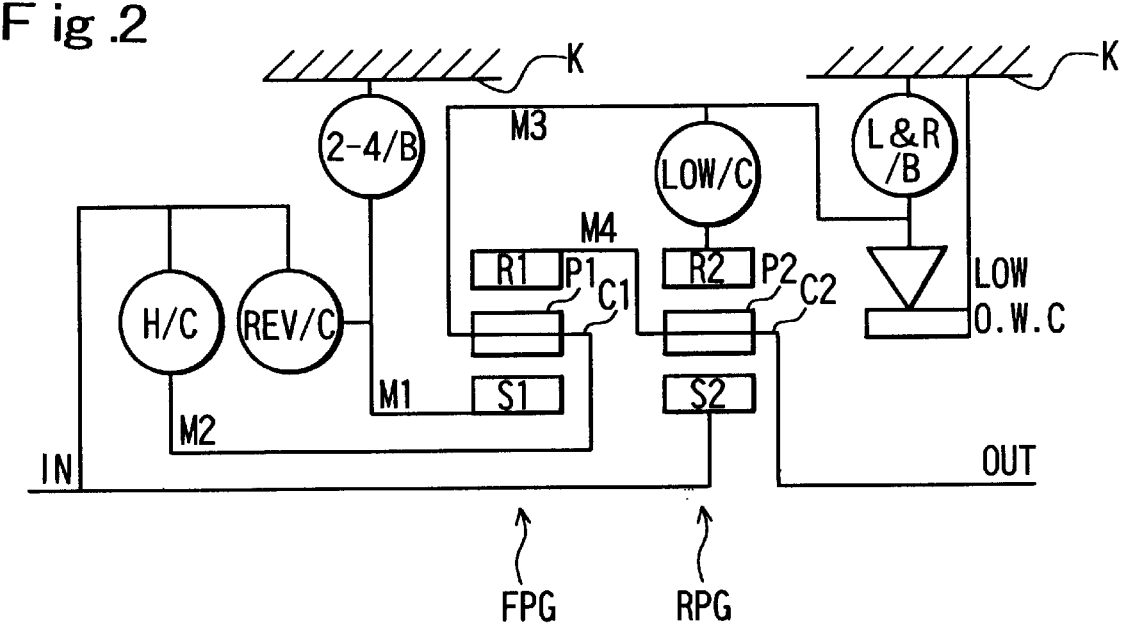
FIG. 2 is a view schematically showing a power transmitting system of the automatic transmission using the hydraulic control device of the first embodiment of the invention.
FIG. 3 is a table showing engaging states of elements of the automatic transmission using the hydraulic control device of the first embodiment.

FIG. 2 is a view schematically showing a power transmitting system of the automatic transmission. In FIG. 2, IN is an input shaft, and OUT is an output shaft, while FPG is a front planetary gear system, and RPG is a rear planetary gear system. The front planetary gear system FPG includes a first sun gear S1, a first ring gear R1, a first pinion P1 and a first pinion carrier C1. The rear planetary gear system RPG includes a second sun gear S2, a second ring gear R2, a second pinion P2 and a second pinion carrier C2.

Engaging elements for establishing forward 4-speed, reverse 1-speed gear positions by using the above-described gear train arrangement are provided which include a reverse clutch REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low&reverse brake L&R/B. Further, the first carrier C1 is connected to the second ring gear R2 through the third rotary member M3 and the low clutch L/C. The low one-way clutch LOW O.W.C. is disposed in parallel with the low&reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a clutch that is hydraulically engaged and needed for ensuring the effect of engine brakes when the above one-way clutch is employed. Thus, the number of engaging elements is reduced, leading to reduced size and weight of the power transmitting system.

FIG. 3 is a view showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low&reverse brake L&R/B (when an engine brake range is selected) or mechanically engaging the low one-way clutch LOW O.W.C. (when the vehicle is accelerated). In this case, the second sun gear S2 is connected to the input shaft IN, and the second ring gear R2 is fixed, while the second carrier C2 is connected to the output shaft OUT.

The 2nd-speed gear position is established by hydraulically engaging the low clutch L/C and the 2-4 brake 2-4/B. In this case, the second sun gear S2 is connected to the input shaft IN, and the first sun gear S1 is fixed, while the second carrier C2 is connected to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the second ring gear R2 is connected to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the second carrier C2 is connected to the output shaft OUT, so as to establish the overdrive gear position.

The reverse gear position is established by hydraulically engaging the reverse clutch REV/C and the low&reverse brake L&R/B. In this case, the first and second sun gears S1, S2 are connected to the input shaft IN, and the first carrier C1 is fixed, while the second carrier C2 is connected to the output shaft OUT.

The 2-4 brake 2-4/B is a multiple-disc brake that is constructed similarly to a multiple-disc clutch.

Figure 4:
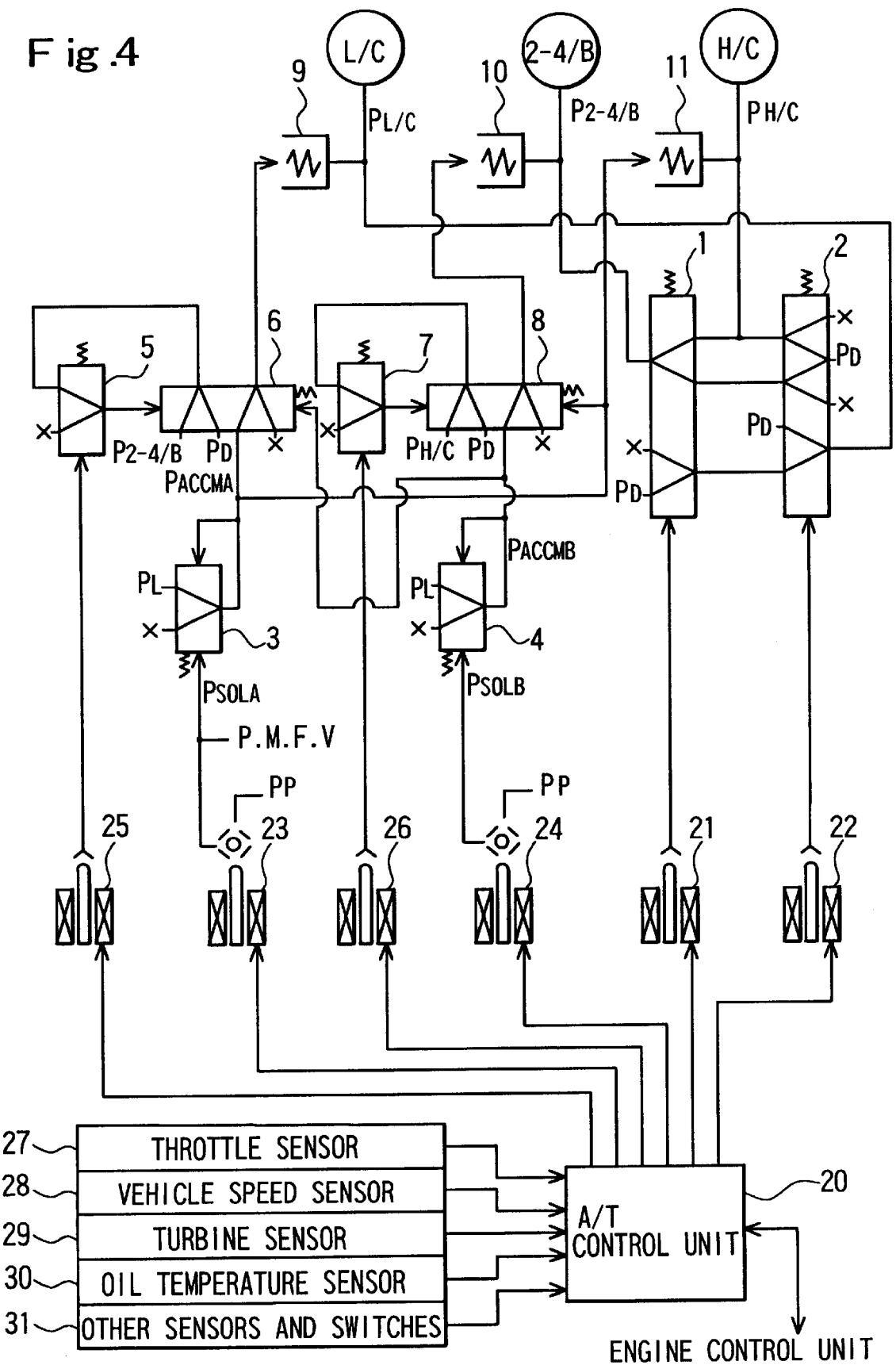
FIG. 4 is a diagram showing the whole control system including a hydraulic control portion and an electronic control portion of the downshift control device of the first embodiment.

FIG. 4 is a control system diagram showing a control valve portion, an electronic control portion, and engaging elements for automatically shifting the transmission to establish one of the above-indicated 1st-speed to 4th-speed gear positions in the D (drive) range. In FIG. 4, the low clutch L/C, 2-4 brake 2-4/B and high clutch H/C are provided as the engaging elements.

In the control valve portion of FIG. 4, there are provided a shift valve (A) 1, shift valve (B) 2, accumulator control valve (A) 3, accumulator control valve (B) 4, low clutch timing valve 5, low clutch sequence valve 6, 2-4 brake timing valve 7, 2-4 brake sequence valve 8, low clutch accumulator 9, 2-4 brake accumulator 10 and high clutch accumulator 11.

The shift valve (A) 1 and shift valve (B) 2 are adapted to switch oil paths to establish each of the 1st-speed to 4th-speed (overdrive) gear positions according to the operations of a shift solenoid (A) 21 and a shift solenoid (B) 22, respectively.

The accumulator control valve (A) 3 reduces a line pressure PL depending upon the level of a solenoid pressure P$_{SOLA}$ produced by a line pressure duty solenoid 23, so as to produce an accumulator control pressure (A) P$_{ACCMA}$. The solenoid pressure P$_{SOLA}$ produced by the line pressure duty solenoid 23 is also led to a pressure modifier valve adapted to produce a modifier pressure that serves as a signal pressure for the line pressure PL produced by a pressure regulator valve (not shown).

The accumulator control valve (B) 4 reduces the line pressure PL depending upon the level of a solenoid pressure PSOLB produced by a 2-4/B duty solenoid 24, so as to produce an accumulator control pressure (B) P$_{ACCMB}$.

The low clutch timing valve 5 is a switch valve that drains a signal pressure oil path when a low clutch timing solenoid 25 is OFF, and produces an oil pressure for communication of the signal pressure oil path when the solenoid 25 is ON. The low clutch sequence valve 6 is adapted to control the back pressure of the low clutch accumulator 9 upon shifting-up to the 4th-speed gear position or shifting-down from the 4th-speed gear position.

The 2-4 brake timing valve 7 is a switch valve that drains a signal pressure oil path when a 2-4 brake timing solenoid 26 is OFF, and produces an oil pressure for communication of the signal pressure oil path when the solenoid 26 is ON. The 2-4 brake sequence valve 8 is adapted to control the back pressure of the 2-4 brake accumulator 10 upon shifting-up to the 3rd-speed gear position or shifting-down from the 3rd-speed gear position.

The low clutch accumulator 9 has a back pressure chamber to which the accumulator control pressure (A) P$_{ACCMA}$ is applied through the low clutch sequence valve 6, so as to smoothly engage and release the low clutch L/C. The 2-4 brake accumulator 10 has a back pressure chamber to which the accumulator control pressure (B) P$_{ACCMB}$ is applied through the 2-4 brake sequence valve 8, so as to smoothly engage and release the 2-4 brake 2-4/B. The high clutch accumulator 11 has a back pressure chamber to which the accumulator control pressure (A) P$_{ACCMA}$ is directly applied, so as to smoothly engage and release the high clutch H/C.

The electronic control portion of FIG. 4 includes shift solenoid (A) 21, shift solenoid (B) 22, line pressure duty solenoid 23, 2-4/B duty solenoid 24, low clutch timing solenoid 25 and 2-4/B timing solenoid 26, as actuators for controlling oil pressures according to drive commands generated by an A/T control unit 20.

The A/T control unit 20 receives as input information various signals from various sensors, such as a throttle sensor 27 for detecting the throttle opening of a throttle valve, a vehicle speed sensor 28 for detecting the vehicle speed, a turbine sensor 29 for detecting the rotating speed of a turbine runner, oil temperature sensor 30 for detecting the oil temperature, and other sensors and switches 31.

Figures 5, 6:
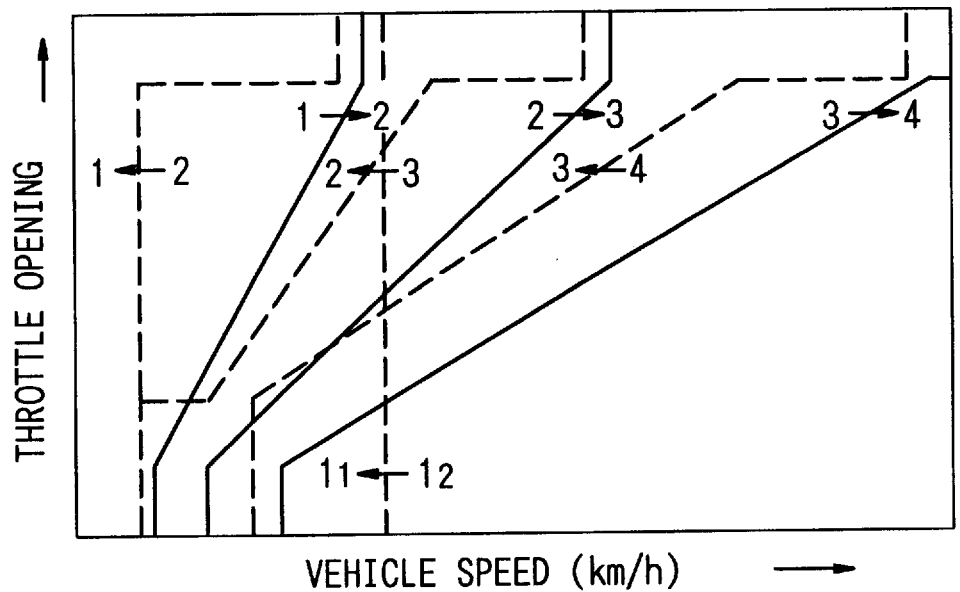
FIG. 5 is a table showing operated states of shift solenoids of the hydraulic control device of the first embodiment.
FIG. 6 is a graph showing one example of gear change point characteristics employed by the hydraulic control device of the first embodiment.

To perform shift control for automatically shifting the transmission from one of the 1st-speed to 4th-speed gear positions to another in the D (drive) range, a gear change command is first generated based on the graph of FIG. 6 indicating gear change points in relation to the detected throttle opening and vehicle speed, when the current point (relationship between the throttle opening and vehicle speed) on the graph passes one of upshifting and downshifting lines, and the gear position to which the transmission should be shifted is determined by this gear change command. To establish the thus determined gear position, the A/T control unit 20 generates ON- or OFF-command to each of the shift solenoid (A) 21 and shift solenoid (B) 22 according to the table of FIG. 5 indicating operated states of the shift solenoids.

There will be next explained the operation of the present embodiment.

Electronic Control Operation upon 4–3 Power-on Downshifting

Figure 7:
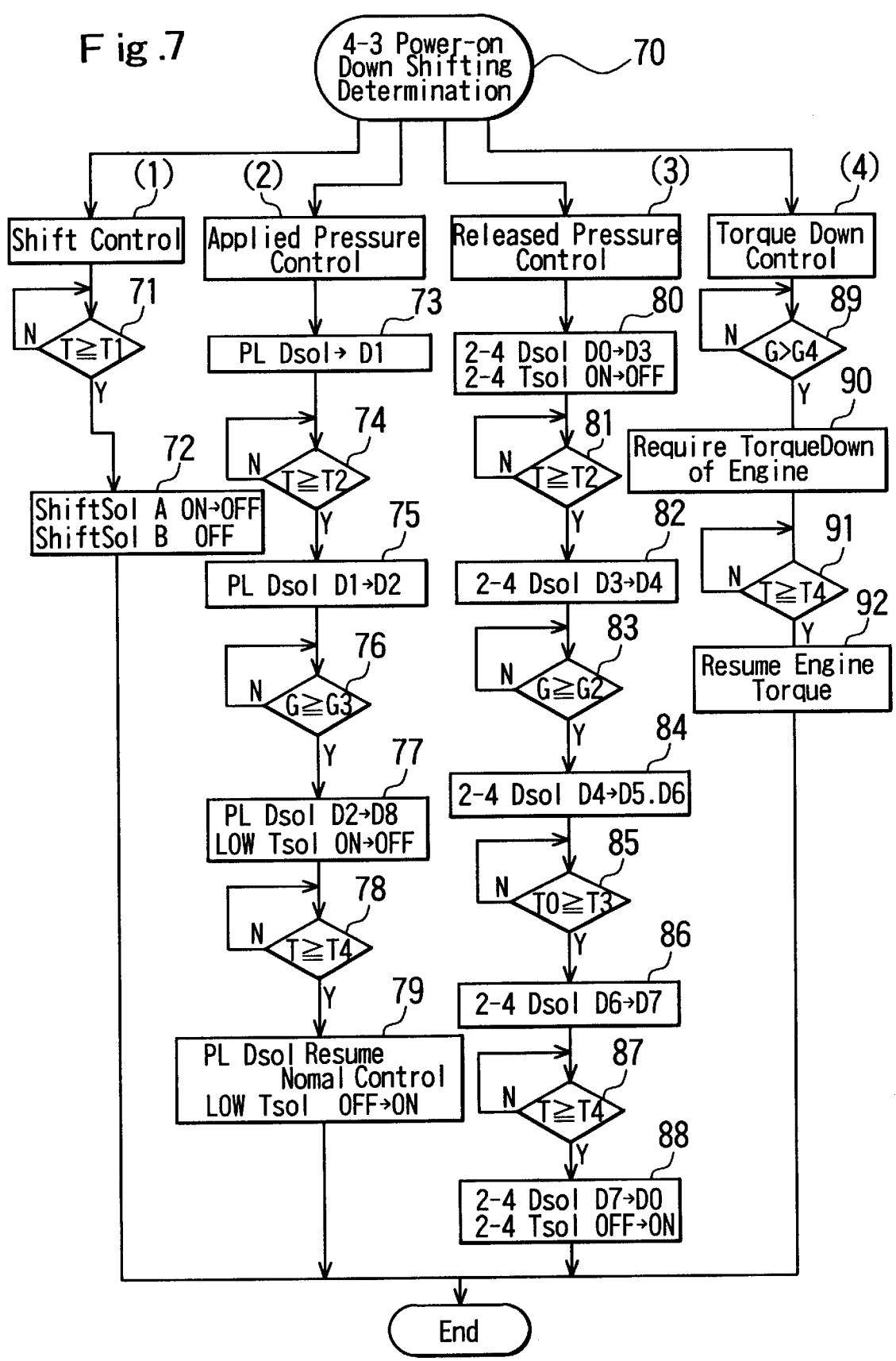
FIG. 7 is a flowchart showing the flow of power-on 4th-speed to 3rd-speed downshift control performed by an A/T control unit of the first embodiment.
Figure 8:
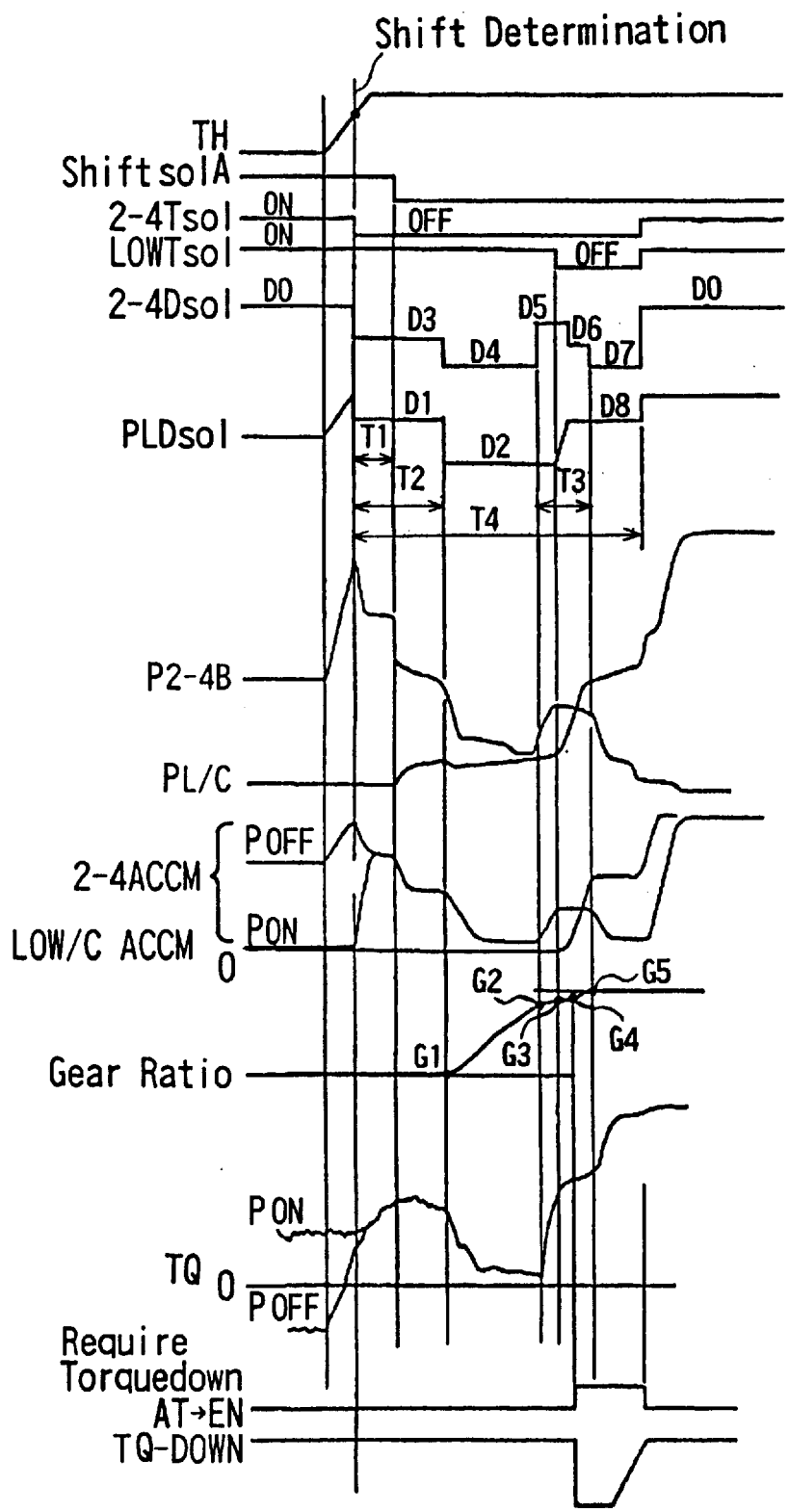
FIG. 8 is a time chart showing respective transient characteristics of control commands, oil pressure, gear ratio, torque and others during the power-on 4th-speed to 3rd-speed downshift operation of the first embodiment.

FIG. 7 is a flow chart showing the flow of the downshift control performed by the A/T control unit 20 when the transmission is shifted down from the 4th-speed to 3rd-speed gear position while an accelerator pedal is depressed, in which control the 2-4 brake 2-4/B (corresponding to the first engaging element "a") is released and the low clutch (corresponding to the second engaging element "b") is engaged. FIG. 8 is a time chart showing transient characteristics of control commands, oil pressures, gear ratio, torque and others during the power-on 4–3 downshifting.

Initially, in step 70 of FIG. 7, it is determined whether the transmission is being shifted down from the 4th-speed to 3rd-speed gear position while the accelerator pedal is being depressed. An affirmative decision (YES) is obtained in this step if two conditions are satisfied, that is, the current point (relationship between the throttle opening and the vehicle speed) on the graph of FIG. 6 indicating gear change points passes the 4–3 downshifting line and a 4–3 downshift command is generated, and the throttle opening is being increased. In this connection, the increase of the throttle opening is determined by calculating a differential value dTH of a detected value TH of the throttle opening received from the throttle sensor 27, and determining that the obtained differential value dTH is larger than zero.

If it is determined that the transmission is shifted down from the 4th-speed to 3rd-speed gear position with the accelerator pedal being depressed, shift control (1), applied pressure control (2), released pressure control (3) and torque down control (4) are implemented independently of each other. If a command to implement the power-on 4–3 downshifting is generated, a timer value T representing the time elapsed after generation of the power-on 4–3 downshift command starts being increased, and arithmetic processing is occasionally performed to determine the actual or current gear ratio G that is the ratio of the turbine speed (rotating speed of the input shaft of the transmission) to the vehicle speed (rotating speed of the output shaft of the transmission), so as to observe changes in the gear ratio from the time when the power-on 4–3 downshift command is generated.

(1) Shift Control

In step 71, it is determined whether the timer value T is equal to or larger than a first predetermined timer value T1. If an affirmative decision (YES) is obtained in step 71, step 72 is executed to switch a command to the shift solenoid (A) 21 from ON to OFF, and keep generating an OFF command to the shift solenoid (B) 22.

(2) Applied Pressure Control

In controlling the pressure to be applied to the low clutch L/C, the line pressure duty solenoid 23 and low-clutch timing solenoid 25 serve as control actuators.

In step 73, a command in the form of duty ratio D1 is generated to the line pressure duty solenoid 23 at the same time that the shift command is generated. In step 74, it is determined whether the timer value T is equal to or larger than a second predetermined timer value T2. If an affirmative decision (YES) is obtained in step 74, step 75 is then executed to generate a command to rapidly reduce the duty ratio of the line pressure duty solenoid 23 from D1 to D2.

In step 76, it is determined whether the actual gear ratio G is equal to or larger than a third predetermined gear ratio G3. If an affirmative decision (YES) is obtained in step 76, step 77 is then executed to generate a command to gradually increase the duty ratio of the line pressure duty solenoid 23 from D2 to D8, and generate a command to switch the low clutch timing solenoid 25 from ON to OFF.

In step 78, it is determined whether the timer value T is equal to or larger than a fourth predetermined timer value T4 (that indicates the time when the shifting operation is completed). If an affirmative decision (YES) is obtained in step 78, step 79 is executed to resume normal control in which a command corresponding to the degree of the throttle opening TH is given to the line pressure duty solenoid 23, while an ON command is generated to the low clutch timing solenoid 25.

(3) Released Pressure Control

In controlling the pressure released from the 2-4 brake 2-4/B, the 2-4/B duty solenoid 24 and 2-4/B timing solenoid 26 serve as control actuators.

In step 80, a command to reduce the duty ratio of the 2-4 duty solenoid 24 from D0 to D3 is generated at the same time that the downshift command is generated. Also, an ON command that has been generated to the 2-4/B timing solenoid 26 is replaced by an OFF command. In step 81, it is determined whether the timer value T is equal to or larger than the second predetermined timer value T2. If an affirmative decision (YES) is obtained in step 81, a command to reduce the duty ratio of the 2-4 B duty solenoid 24 from D3 to D4 is generated.

In step 83, it is determined whether the actual gear ratio G is equal to or larger than a second predetermined gear ratio G2 (<G3) or not. If an affirmative decision (YES) is obtained in step 83, step 84 is executed to rapidly increase the duty ratio of the 2-4/B duty solenoid 24 from D4 to D5, and then generate a command to maintain the duty ratio at the level of D6. Thus, the duty ratio is temporarily increased from D4 to D5 so as to ensure high response of the released pressure to the increase in the oil pressure applied to the low clutch L/C.

In step 85, it is determined whether the timer value T0 that starts being counted at the point of time when the actual gear ratio G reaches the second predetermined gear ratio G2 is equal to or larger than the third predetermined timer value T3. If an affirmative decision (YES) is obtained in step 85, step 86 is then executed to reduce the duty ratio of the 2-4/B duty solenoid 24 from D6 to D7.

In step 87, it is determined whether the timer value T is equal to or larger than the fourth predetermined timer value T4. If an affirmative decision (YES) is obtained in step 87, step 88 is executed to return the duty ratio of the 2-4/B duty solenoid 24 from D7 to D0 for normal control, and generate an ON command to the 2-4/B timing solenoid 26.

(4) Torque Down Control

In step 89, it is determined whether the actual gear ratio G is equal to or larger than a fourth predetermined gear ratio G4 (>G3) or not. If an affirmative decision (YES) is obtained in step 89, then the A/T control unit 20 requires an engine control unit to reduce the engine torque by cutting the fuel or retarding ignition timing, for example, in step 90.

In step 91, it is determined whether the timer value T is equal to or larger than a fourth predetermined timer value T4. If an affirmative decision (YES) is obtained in step 91, step 92 is executed to recover or resume the engine torque to a normal level.

Shift Control Operation

The shift control as described above is characterized in that the shift valve is not actuated to initiate the shifting operation at the same time that the downshift command is generated, but the shifting is initiated upon a lapse of delay time that is a duration between the time when the downshift command is generated and the time when the first predetermined timer value T1 is reached.

Figure 9:
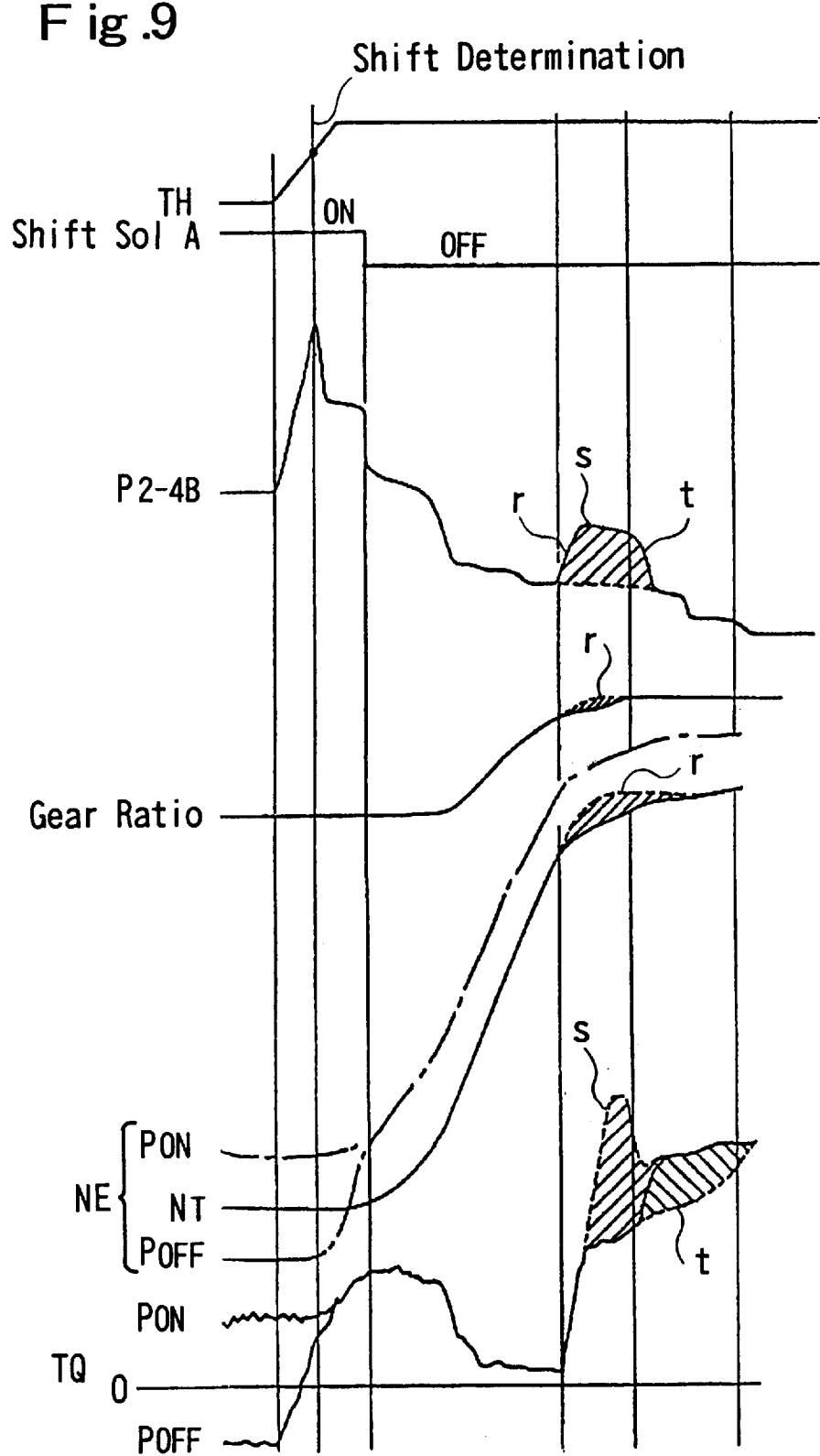
FIG. 9 is a time chart showing respective transient characteristics of oil pressure, gear ratio, torque and others, for explaining the effect of controlling the released pressure in first embodiment.

Accordingly, the engine speed NE is increased with the accelerator pedal depressed during the delay time from the generation of the downshift command to the first predetermined timer value T1, as shown in FIG. 9. By the time when the shifting operation is actually started by generating the OFF command to the shift solenoid (A) 21 to turn off the solenoid (A) 21, the engine speed has been increased so that the shifting can be always started in the power-on condition no matter whether the vehicle is in the power-off state or power-on state before the transmission is shifted down from the 4th-speed to 3rd-speed gear position.

As a result, the shifting operation can be terminated in almost the same timing irrespective of whether the vehicle is in the power-on or power-off state before generation of the downshift command, thus eliminating a need to set two different modes, i.e., one mode for power-on 4–3 downshifting from the power-off state, and the other mode for power-on 4–3 downshifting from the power-on state, when controlling transient oil pressures in the transmission system. Namely, the same control can be performed for controlling the transient oil pressures during shifting no matter whether the vehicle is in the power-on or power-off state before the downshift command is generated.

Transient Oil Pressure Control during Shifting

When it is determined during running of the vehicle that the transmission is being shifted down from the 4th-speed to 3rd-speed gear position while the accelerator pedal is being depressed, the shift valve (A) 21 is switched off, thereby to release the oil pressure from the 2-4 brake 2-4/B that has been engaged in the 4th-speed gear position, and applying the oil pressure to the low clutch L/C that has been released in the 4th-speed gear position. In this oil pressure control, the pressure applied to the low clutch L/C is controlled by controlling the line pressure duty solenoid 23 and low clutch timing solenoid 25, and the pressure released from the 2-4 brake 2-4/B is controlled by controlling the 2-4 B duty solenoid 24 and 2-4 B timing solenoid 26. Thus, the pressure applied to the low clutch L/C and the pressure released from the 2-4 brake 2-4/B are controlled independently of each other. There will be hereinafter described characteristics of the transient oil pressure control during shifting.

(1) The first characteristic of the present embodiment is in that the released pressure of the 2-4 brake 2-4 B that has been lowered is temporarily increased when the actual gear ratio G reaches the second predetermined gear ratio G2 in the later period of downshifting, and then the pressure applied to the low clutch L/C is rapidly increased when the actual gear ratio G reaches the third predetermined gear ratio G3 that is larger than the second predetermined ratio G2 and is to be established just before completion of the shifting operation.

Accordingly, the slope of increase of the turbine speed NT (=slope of increase in the gear ratio) is kept being small during the later period of downshifting, as indicated by hatched area "r" in FIG. 9, so that the pressure applied to the low clutch L/C can be increased upon detection of a suitable gear ratio, within a certain range of time that allows for some variations in the timing of increasing the applied pressure. Thus, even where rotating conditions of the input and output shafts of the transmission and oil temperatures slightly differ in each shift-down operation, the automatic transmission can achieve synchronous rotation of the input and output shafts, without causing pull-in shocks or thrust shocks.

In other words, the above control of the pressure released from the 2-4 brake 2-4/B contributes to controlling the rotation of the transmission input shaft so as to make it easier to determine the timing in which the pressure applied to the low clutch L/C is increased. With an increase in the released pressure in the later period of shifting, the 2-4 brake 2-4/B that has been almost completely released is lightly engaged again, so as to temporarily retard or delay the process of downshifting.

(2) The second characteristic of the present embodiment is in that the light engagement of the 2-4 brake 2-4/B in the later period of shifting is kept for a period corresponding to the third predetermined timer value T3. In this case, the engine is prevented from racing that would occur in the case where the 2-4 brake 2-4 B is released without being lightly engaged again during the 4–3 power-on downshifting. By pulling down the rotation of the racing engine, an excessive increase in the output torque TQ that appears upon completion of the shifting may be eliminated (as indicated by the hatched area "s" in FIG. 9), and the shock level that is determined by a fall of the output torque TQ can be reduced to be sufficiently small.

(3) The third characteristic of the present embodiment is in that the released pressure that has been increased as described above is lowered again after it is held at the elevated level for the period corresponding to the third predetermined timer value T3.

More specifically, if the shifting operation is terminated with the released pressure of the 2-4 brake 2-4/B having been increased, the increase of the output torque TQ is excessively restricted, resulting in poor acceleration of the vehicle immediately after the shifting, and causing judder due to the light engagement of the 2-4 brake 2-4/B. In the present embodiment, on the other hand, the released pressure that has been increased is lowered again, thereby to increase the output torque TQ as indicated by hatched area "t" in FIG. 9, thus assuring a good accelerating characteristic of the vehicle immediately after the shifting, while yielding the effects of (1) and (2) as described above.

(4) The fourth characteristic of the present embodiment is in that the back pressure of the 2-4 brake accumulator 10 provided in an oil path leading to the 2-4 brake 2-4/B is controlled for controlling the pressure released from the 2-4 A-brake 2-4/B.

Namely, as a method for controlling the released pressure of the 2-4 brake 2-4/B, the oil pressure released from the 2-4 brake 2-4 B may be directly controlled. In this direct control method, however, the pressure control is greatly affected by the flow rate in oil chambers and oil paths, and thus suffer from lack of stability. Where the back pressure of the 2-4 brake accumulator 10 is controlled so as to provide shelf-pressure characteristics, on the other hand, the engaging pressure applied to the 2-4 brake 2-4/B is immediately changed by varying the accumulator back pressure, thus assuring quick response and high stability.

(5) The fifth characteristic of the present embodiment is in that the duty ratios D3, D4, D6, D7 of the 2-4/B duty solenoid 24 used for controlling the released pressure of the 2-4 brake 2-4/B are corrected by learning so as to be close to respective optimum values.

Figure 10:
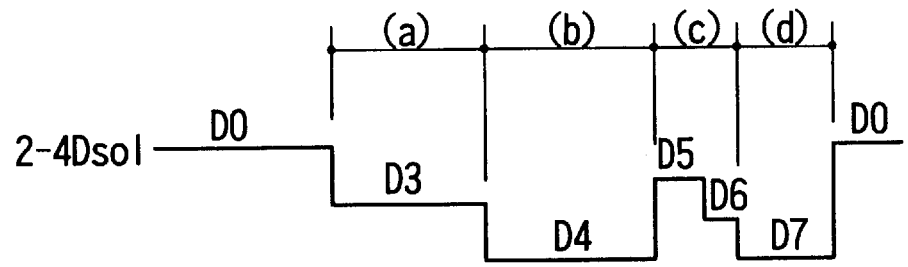
FIG. 10 is a view showing changes in the level of the duty ratio with which a 2-4/B duty solenoid is operated, in respective stages of a downshift control operation, for explaining control of the device of the first embodiment for correcting the duty ratio by learning.

To implement the correction by learning, the duration in which the shifting operation proceeds is divided into a region (a) for holding the 2-4 brake 2-4/B, region (b) for releasing the 2-4 brake 2-4/B, region (c) for holding the 2-4 brake 2-4/B again, and a region (d) for releasing the 2-4 brake 2-4/B again, as shown in FIG. 10.

Figure 11:
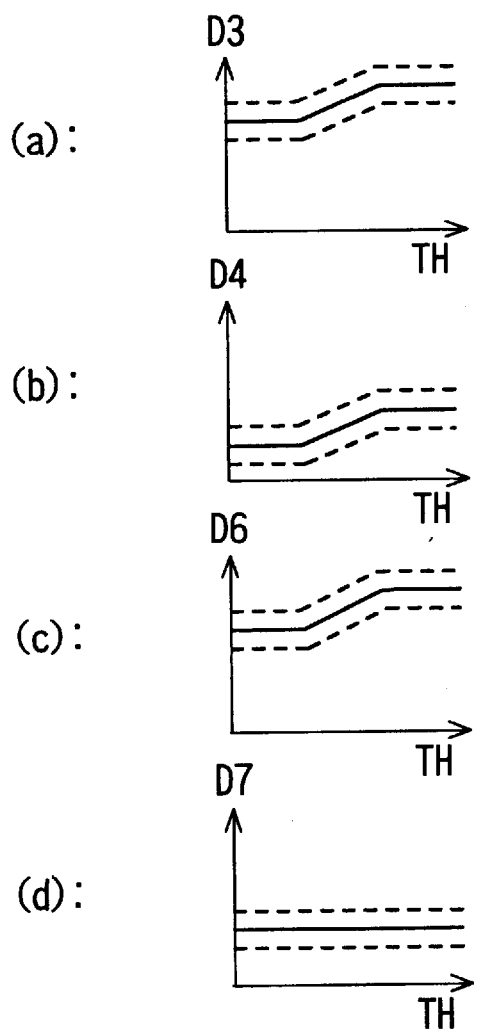
FIG. 11 is a view showing an example of learning correction maps used in the first embodiment when the correction of the duty ratio by learning is based on the throttle opening.
Figure 12:
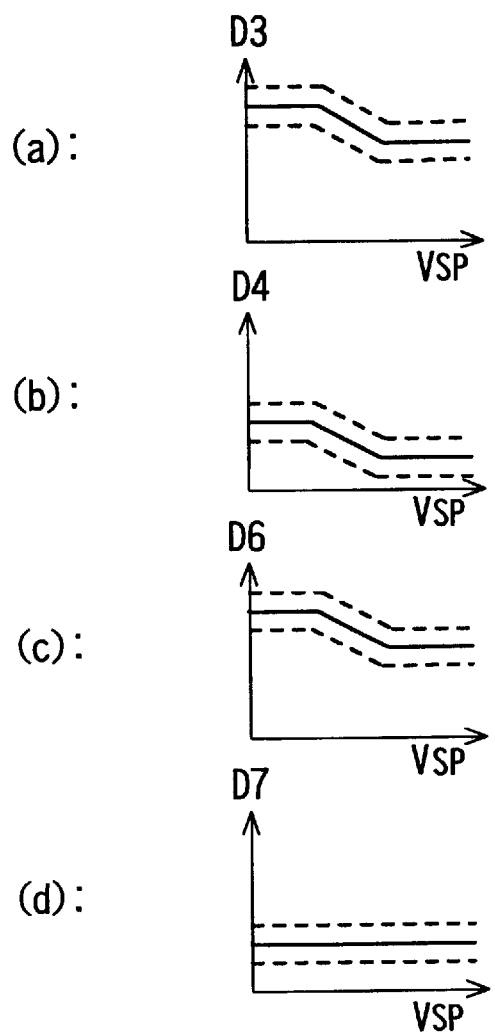
FIG. 12 is a view showing an example of learning correction maps used in the first embodiment when the correction of the duty ratio by learning is based on the vehicle speed.

Maps used for correcting the duty ratios D3, D4, D6, D7 in each of the above regions (a)–(d) may be those based on the throttle opening TH as shown in FIG. 11, or those based on the vehicle speed vP as shown in FIG. 12, for example, and these maps may be updated in the following manner.

Figure 13:
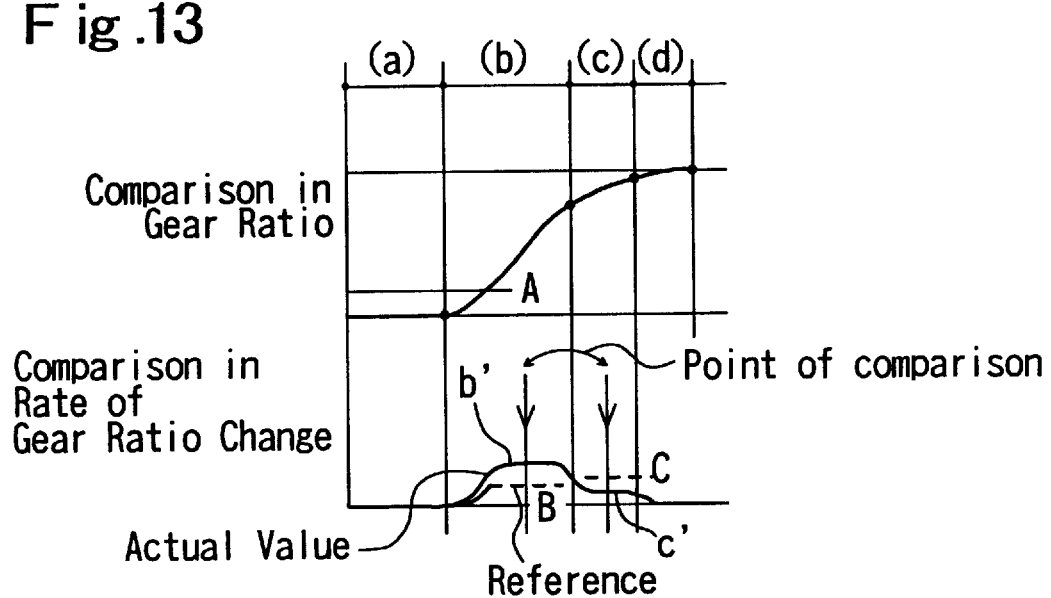
FIG. 13 is a view showing an example of comparing the actual gear ratio with a reference gear ratio, and an example of comparing the actual rate of change in the gear ratio with a reference change rate, for explaining a method of correcting the duty ratio by learning in the first embodiment.
Figure 14:
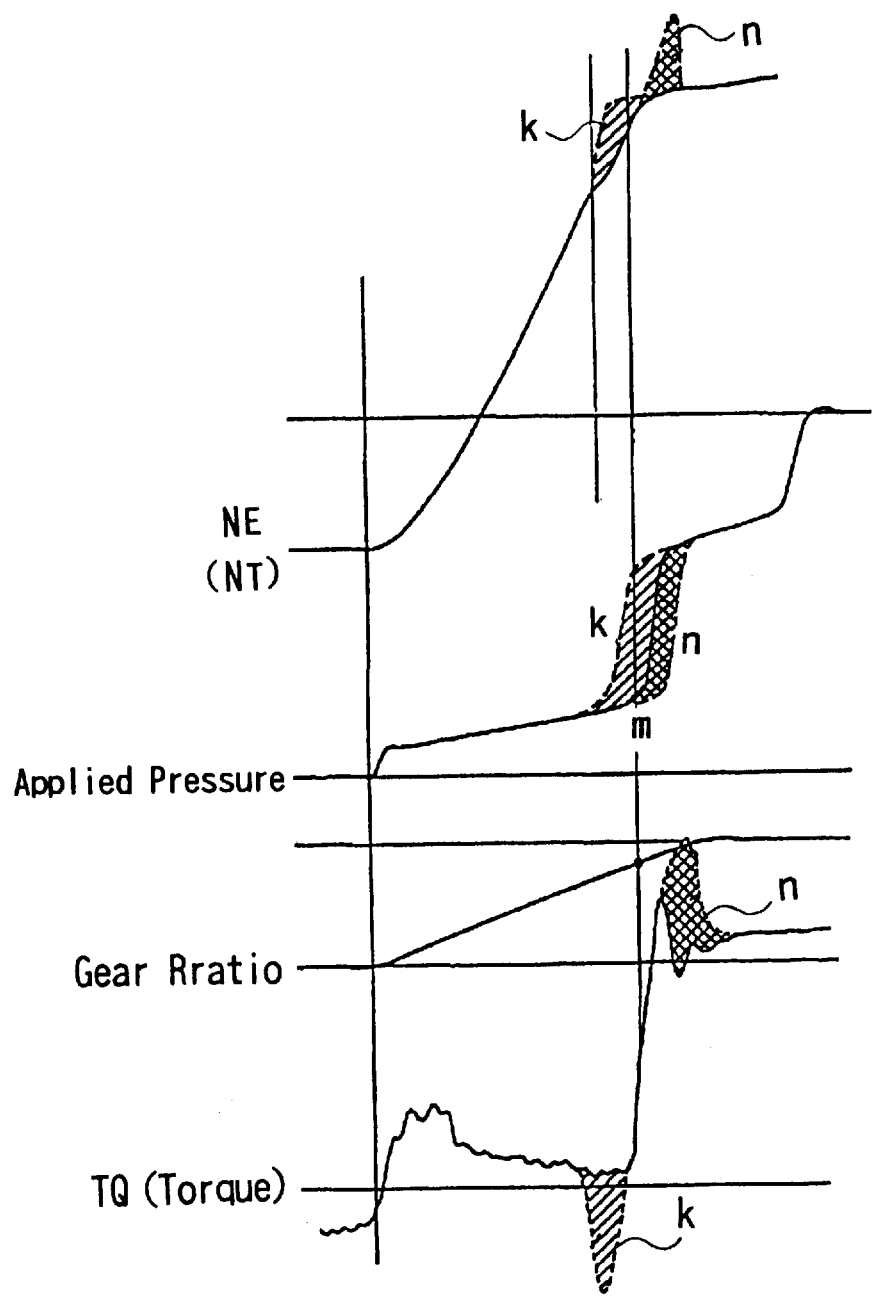
FIG. 14 is a time chart explaining control of the timing in which the applied pressure is increased upon detection of a suitable gear ratio in conventional power-on downshifting.

As shown in FIG. 13, for example, the duty ratio D3 in the (a) region is reduced (to the minimum at a certain point) if the actual gear ratio G detected when the (a) region proceeds to the (b) region is smaller than a reference gear ratio A (G<A), whereas the duty ratio D3 is increased (to the maximum at a certain point) if the actual gear ratio G is larger than the reference gear ratio A (G>A). The duty ratio D4 in the (b) region is reduced (to the minimum at a certain point) if the rate of change in the gear ratio b' detected when the (b) region proceeds to the (c) region is smaller than a reference rate of change of the gear ratio B (b'<B), whereas the duty ratio D4 is increased (to the maximum at a certain point) if the rate of change in the gear ratio b' is larger than the reference rate of change of the gear ratio B (b'>B). The duty ratio D6 in the (c) region is reduced (to the minimum at a certain point) if the rate of change of the gear ratio c' detected when the (c) region proceeds to the (d) region is smaller than a reference rate of change of the gear ratio C (c'<C), whereas the duty ratio D6 is increased (to the maximum at a certain point) when the rate of change of the gear ratio c' is larger than the reference rate of change of the gear ration C (c'>C). By repeatedly correcting the duty ratios by learning in this manner each time the power-on 4–3 downshifting is effected, the level of the pressure released from the 2-4 brake 2-4/B can be optimized irrespective of variations or chronological changes in the system.

Torque Down Control Operation

In the later period of the power-on 4–3 downshifting in which the output torque TQ is greatly increased, the torque down control is implemented to temporarily reduce the engine torque by cutting the fuel, for example. With the torque down control for reducing the engine torque performed along with other controls for the power-on 4–3 downshifting, variations in the output torque TQ can be reduced, assuring reduced shift shocks and high shifting quality.

Modifications of the Embodiments

While the power-on 4th-speed to 3rd-speed downshifting has been described by way of example in the illustrated embodiment, the downshift control according to the present invention is also applicable to power-on 3rd-speed to 2nd-speed and 4th-speed to 2nd-speed shift-down operations, and to 5th-speed to 4th-speed and 5th-speed to 3rd-speed shift-down operations where the automatic transmission has five gear positions. The downshift control of the present invention may also be applied when the lower gear position is manually selected to shift down the transmission while the vehicle is in the power-on condition.

While the transient oil pressure characteristics upon power-on downshifting are controlled by suitably controlling the back pressures of the accumulators for the relevant engaging elements in the illustrated embodiment, the present invention may be applied to a system in which the pressures of the engaging elements are directly controlled.

While two actuators are used for controlling the pressure applied to the engaging element to be engaged and the pressure released from the engaging element to be released, respectively, in the illustrated embodiment, the present invention may be try applied to a system equipped with at least one actuator provided that the hydraulic control of the applied pressure can be performed independently of the hydraulic control of the released pressure.

While the first predetermined timer value T1 is given as a fixed value in the illustrated embodiment, a variable delay time may be determined depending upon the throttle opening (or other signal representing the engine torque, such as an amount of the intake air of the engine or a basic pulse width of the fuel injection), or vehicle speed, type of downshifting or level of the oil temperature. The variable delay time may be also determined depending upon two or more of parameters including the vehicle speed, throttle opening, type of downshifting and the oil pressure.

While the second predetermined timer value T2 is set in the timer to control the period of time during which the released pressure is lowered in the illustrated embodiment, the actual gear ratio may be monitored instead so that the released pressure is reduced at the moment when the actual gear ratio changes from the gear ratio of the gear position established before the downshifting.

While the released pressure is lowered by operating the 2-4 duty solenoid 24 with a predetermined duty ratio D4 in the (b) region in the illustrated embodiment, the duty ratio may be further lowered where no change in the gear ratio is observed, or the duty ratio may be slowly lowered by open control in the (b) region.

In the illustrated embodiment, when the actual gear ratio G becomes equal to or larger than the second predetermined gear ratio G2, the duty ratio is controlled to D5 and then to D6 in the (c) region, during the period corresponding to the third predetermined timer value T3. However, the time period of the (c) region during which the released pressure is increased may be determined not by monitoring the timer, but by monitoring the gear ratio or monitoring the timer and gear ratio. The control of the oil pressure in the (c) region may be performed such that the duty ratio is changed so as to further increase the oil pressure if the turbine speed NE (actual gear ratio G) does not change or the slope of its change is small even with an increase in the oil pressure by setting the duty ratio at a high level. In another method, the duty ratio may be slowly increased in the (c) region. The hydraulic control of the released pressure as described above may not be performed as learning control to set the optimum duty ratios for the next shifting operation, but may be performed in a feedback manner in real time.

What is claimed is:

1. A downshift control device for an automatic transmission wherein the transmission is shifted down to a first gear position to be established after downshifting, by releasing an oil pressure from a first engaging element that has been engaged in a second gear position established before the downshifting while applying an oil pressure to a second engaging element that has been released in the second gear position, said downshift control device comprising:

power-on downshift determining means for determining whether a downshift command is generated to shift down the automatic transmission while an accelerator pedal is being depressed;

gear ratio detecting means for detecting a gear ratio of the transmission that changes during power-on downshift control;

a released pressure control actuator for controlling a pressure released from said first engaging element that is to be released by downshifting;

an applied pressure control actuator for controlling a pressure applied to said second engaging element that is to be engaged by downshifting;

downshift released pressure control means for generating a first command to increase said pressure released from said first engaging element to said released pressure control actuator when the gear ratio detected by said gear ratio detecting means reaches a first predetermined gear ratio; and downshift applied pressure control means for generating a second command to increase said pressure applied to said second engaging element to said applied pressure control actuator when the gear ratio detected by said gear ratio detecting means reaches a second predetermined gear ratio that is larger than said first predetermined gear ratio and is established just before completion of the downshifting.

2. A downshift control device for an automatic transmission according to claim 1, wherein said downshift released pressure control means generates said first command to increase the pressure released from the first engaging element when the detected gear ratio reaches said first predetermined gear ratio, and then generates a third command to hold the increased released pressure for a predetermined period of time, said first command and said third command being generated to said released pressure control actuator.

3. A downshift control device for an automatic transmission according to claim 2, wherein said downshift released pressure control means generates said first command to increase the pressure released from the first engaging element when the detected gear ratio reaches said first predetermined gear ratio, then generates said third command to hold the increased released pressure for the predetermined period of time, and then generates a fourth command to lower the increased released pressure, said first, third and fourth commands being generated to said released pressure control actuator.

4. A downshift control device for an automatic transmission according to claim 1, wherein said released pressure control actuator comprises a solenoid valve which continuously controls a back pressure of an accumulator for said first engaging element in response to a drive command received from said downshift released pressure control means.

5. A downshift control device for an automatic transmission according to claim 1, further comprising:

learning correction means for correcting by learning a level of the pressure released from the first engaging element which is controlled by said downshift released pressure control means, depending upon a value of the gear ratio or a rate of change in the gear ratio.

* * * * *